(12) United States Patent
Pan et al.

(10) Patent No.: US 11,295,556 B2
(45) Date of Patent: Apr. 5, 2022

(54) SYSTEMS AND METHODS FOR VISUALLY DISPLAYING A CURRENT STATE OF A VEHICLE IN REGARDS TO OPERATIONAL CONSTRAINTS OF THE VEHICLE

(71) Applicant: Toyota Research Institute, Inc., Los Altos, CA (US)

(72) Inventors: Selina Pan, San Francisco, CA (US); Carrie Bobier-Tiu, Sunnyvale, CA (US); Avinash Balachandran, Sunnyvale, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 275 days.

(21) Appl. No.: 16/238,354

(22) Filed: Jan. 2, 2019

(65) Prior Publication Data

US 2020/0211298 A1 Jul. 2, 2020

(51) Int. Cl.
*G07C 5/00* (2006.01)
*B60R 16/023* (2006.01)
*G06K 9/00* (2022.01)
*G07C 5/08* (2006.01)

(52) U.S. Cl.
CPC .......... *G07C 5/004* (2013.01); *B60R 16/0232* (2013.01); *G06K 9/00791* (2013.01); *G07C 5/0825* (2013.01)

(58) Field of Classification Search
CPC .. G07C 5/004; G07C 5/0825; G06K 9/00791; B60R 16/0232
See application file for complete search history.

(56) References Cited

U.S. PATENT DOCUMENTS

| 5,309,139 A | 5/1994 | Austin |
| 7,561,054 B2 | 7/2009 | Raz |
| 2003/0163229 A1 | 8/2003 | Pillar |
| 2008/0221769 A1* | 9/2008 | Matsuno ............. B60W 40/101 701/80 |

(Continued)

OTHER PUBLICATIONS

Pandita, et al., "Reachability and Region of Attraction Analysis Applied to GTM Dynamic Flight Envelope Assessment", Proceedings of AIAA Guidance, Navigation, and Control Conference, Chicago, Illinois, 2009.

(Continued)

*Primary Examiner* — Tyler J Lee
*Assistant Examiner* — Yufeng Zhang
(74) *Attorney, Agent, or Firm* — Sheppard, Mullin, Richter & Hampton LLP; Hector A. Agdeppa; Daniel N. Yannuzzi

(57) ABSTRACT

Systems and methods of a vehicle for visually displaying a current state of a vehicle in regards to operational constraints of the vehicle are disclosed. Exemplary implementations may: generate output signals conveying operational information regarding the vehicle; visually present information; determine, based on the output signals, the operational information; determine, based on the operational information, a current vehicle state of the vehicle; determine, based on the operational information, predicted boundaries of the current vehicle state; determine a metric value of a metric representing a difference between the current vehicle state and the predicted boundaries of the current vehicle state; and effectuate display of the metric upon the visual display unit.

20 Claims, 3 Drawing Sheets

(56) References Cited

U.S. PATENT DOCUMENTS

| | | | |
|---|---|---|---|
| 2014/0121863 A1 | 5/2014 | Barraci | |
| 2019/0217854 A1* | 7/2019 | Park | B60W 30/045 |
| 2019/0375429 A1* | 12/2019 | Gardner | B60W 50/087 |
| 2019/0377354 A1* | 12/2019 | Shalev-Shwartz | ............................ B60W 30/0956 |

OTHER PUBLICATIONS

Plessen, "Trajectory Planning of Automated Vehicles in Tube-like Road Segments", arXiv:1705.04371,2017, Jul. 24, 2017.
Reynolds, "Design of a Subsonic Envelope Flight Control System for the Vista F-16 Using Quantitative Feedback Theory", thesis, Air Force Institute of Technology, 1993.
Reynolds, et al., "Full Envelope Flight Control System Design Using QFT", Proceedings of the American Control Conference, Barltimore, Maryland, Jun. 1994, pp. 350-354.
Sahani, "Envelope Protection Systems for Piloted and Unmanned Rotorcraft", thesis, Pennsylvania State University, 2005.
Saleh, et al., "Shared Steering Control Between a Driver and an Automation: Stability in the Presence of Driver Behavior Uncertainty", IEEE Transactions on Intelligent Transportation Systems, 14(2):974-983, Jun. 2013.
Song, et al., "Active Model-Based Predictive Control and Experimental Investigation on Unmanned Helicopters in Full Flight Envelope", IEEE Transactions on Control Systems Technology,, vol. 21, No. 4, Jul. 2013, pp. 1502-1509.
Sparks, et al., "Fighter Aircraft Lateral Axis Full Envelope Control Law Design," IEEE International Conference on Control and Applications, vol. 1, Vancouver, B.C., Sep. 13-16, 1993, pp. 21-26.
Tan, et al., "Shared Control for Lane Departure Prevention Based on the Safe Envelope of Steering Wheel Angle", Control Engineering Practice, vol. 64, 2017, pp. 15-26, ISSN 0967-0661, https://doi.org/10.1016/j.conengprac.2017.04.010.
Tang, et al., "Methodologies for Adaptive Flight Envelope Estimation and Protection", Proceedings of AIAA Guidance, Navigation, and Control Conference, Chicago, Illinois, 2009, pp. 1-14.
Tekles, et al., "Flight Envelope Protection for NASA's Transport Class Model", AIAA Guidance, Navigation, and Control Conference, National Harbor, Maryland, Jan. 13-17, 2014, pp. 1-47.
Tomlin, et al., "Aerodynamic Envelope Protection using Hybrid Control," Proceedings of the American Control Conference, vol. 3, (IEEE Cat. No. 98CH36207), Philadelphia, PA, Jun. 1998, pp. 1793-1796.
Unnikrishnan, "Adaptive Envelope Protection Methods for Aircraft", thesis, Georgia Institute of Technology, Aug. 2006.
Waldrop, "Flying the Electric Skies", Science, vol. 244, No. 4912:1532-1534, Jun. 30, 1989.
Well, "Aircraft Control Laws for Envelope Protection", AIAA Guidance, Navigation, and Control Conference, AIAA 2006-6055, GNC Conference, Aug. 21-24, 2006.
Whalley, "A Comparison of Active Sidestick and Conventional Inceptors for Helicopter Flight Envelope Tactile Cueing", NASA Technical Report Server, Jan. 1, 2000 retrieved from https://ntrs.nasa.gov/search.jsp?R=20000092066.
Yavrucuk, "Envelope Protection in Autonomous Unmanned Aerial Vehicles", Journal of Guidance, Control, and Dynamics, vol. 32, No. 1, 2009, pp. 248-261.
Ackerman, et al., "Flight Envelope Information—Augmented Display for Enhanced Pilot Situation Awareness", NASA Technical Reports Server, NASA, Mar. 17, 2017, ntrs.nasa.gov/archive/nasa/casi.ntrs.nasa.gov/20160005910.pdf.
Anderson, et al., "Constraint-Based Planning and Control for Safe, Semi-Autonomous Operation of Vehicles", 2012 Intelligent Vehicles Symposium, Jun. 3-7, 2012, pp. 383-388.
Balachandran, "Applications of Force Feedback Steering for Steer-by-Wire Vehicles With Active Steering", thesis, Stanford University, Jun. 2015, retrieved from http://purl.stanford.edu/wz736wf4893.
Balachandran, et al., "Creating Predictive Haptic Feedback for Obstacle Avoidance Using a Model Predictive Control (MPC) Framework", 2015 IEEE Intelligent Vehicles Symposium (IV), Jun. 28-Jul. 1, 2015, pp. 31-36.
Balachandran, et al., "Predictive Haptic Feedback for Obstacle Avoidance Based on Model Predictive Control", IEEE Transactions on Automation Science and Engineering, vol. 13, No. 1, Jan. 2016.
Balachandran, et al., "The Virtual Wheel Concept for Supportive Steering Feedback During Active Steering Interventions", ASME 2014 Dynamic Systems and Control Conference, vol. 2, Oct. 22-24, 2014.
Beal, "Applications of Model Predictive Control to Vehicle Dynamics for Active Safety and Stability", thesis, Stanford University, Aug. 2011.
Beal, "Stabilization of a Vehicle Traversing a Short Low-Friction Road Segment," 2017 IEEE Conference on Control Technology and Applications (CCTA) , Mauna Lani, HI, 2017, pp. 1898-1903.
Beal, et al. "Experimental Validation of a Linear Model Predictive Envelope Controller in the Presence of Vehicle Nonlinearities", IFAC Proceedings Volumes, vol. 43, Issue 7, 2010, pp. 25-30, ISSN 1474-6670, ISBN 9783902661722, https://doi.org/10.3182/20100712-3-DE-2013.00041.
Beal, et al., "A Method for Incorporating Nonlinear Tire Behavior Into Model Predictive Control for Vehicle Stability", ASME. Dynamic Systems and Control Conference, ASME 2010 Dynamic Systems and Control Conference, vol. 1: 157-164.
Beal, et al., "Controlling Vehicle Instability Through Stable Handling Envelopes.", ASME. Dynamic Systems and Control Conference, ASME 2011 Dynamic Systems and Control Conference and Bath/ASME Symposium on Fluid Power and Motion Control, vol. 2: 861-868.
Beal, et al., "Model Predictive Control for Vehicle Stabilization at the Limits of Handling", IEEE Transactions on Control Systems Technology, vol. 21, No. 4, Jul. 2013, pp. 1258-1269.
Beal, et al., "Predictive Control of Vehicle Roll Dynamics with Rear Wheel Steering," Proceedings of the 2010 American Control Conference , Baltimore, MD, 2010, pp. 1489-1494.
Beal, et al., "Enhancing Vehicle Stability Through Model Predictive Control", ASME. Dynamic Systems and Control Conference, ASME 2009 Dynamic Systems and Control Conference, vol. 1: 197-204.
Bobier, et al., "Envelope Control: Stabilizing within the Limits of Handling Using a Sliding Surface", IFAC Proceedings Volumes, vol. 43, Issue 7, 2010, pp. 162-167, ISSN 1474-6670, ISBN 9783902661722, https://doi.org/10.3182/20100712-3-DE-2013.00012.
Bobier, et al., "Sliding Surface Envelope Control: Keeping the Vehicle Within a Safe State-Space Boundary", ASME 2010 Dynamic Systems and Control Conference, vol. 1: 149-156.
Bobier, et al., "Sliding Surface Vehicle Envelope Control: A Cooperative Design Between Controller and Envelope," 2012 American Control Conference (ACC), Montreal, QC, 2012, pp. 6521-6526.
Bobier, et al., "Staying Within the Nullcline Boundary for Vehicle Envelope Control Using a Sliding Surface", Vehicle System Dynamics, vol. 51, No. 2, Feb. 2013, p. 199-217.
Bobier. "A Phase Portrait Approach to Vehicle Stabilization and Envelope Control", thesis, Stanford University, Aug. 2012.
Boehm, et al., "Architectures for Shared Control of Vehicle Steering", IFAC—PapersOnLine, vol. 49, Issue 19, 2016, pp. 639-644, ISSN 2405-8963, https://doi.org/10.1016/j.ifacol.2016.10.637.
Bottasso, et al., "Rotorcraft Flight Envelope Protection by Model Predictive Control", Journal of the American Helicopter Society, vol. 60(2), pp. 1-13, 2015.
Briere, et al. "Airbus A320/A330/A340 Electrical Flight Controls—A Family of Fault-Tolerant Systems", In Proceedings of FTCS-23 The Twenty-Third International Symposium on Fault-Tolerant Computing, Toulouse, 1993, pp. 616-623.
Brown, et al., "Safe Driving Envelopes for Path Tracking in Autonomous Vehicles", Control Engineering Practice, vol. 61, 2017, pp. 307-316, ISSN 0967-0661, https://doi.org/10.1016/j.conengprac.2016.04.013.
Cotting, et al., "Reconfigurable Control Design for the Full X-33 Flight Envelope," In Proceedings of AIAA Guidance, Navigation and Control Conference, Montreal, Canada, Aug. 2001.

(56) References Cited

OTHER PUBLICATIONS

Enache, et al., "Driver Steering Assistance for Lane-Departure Avoidance Based on Hybrid Automata and Composite Lyapunov Function", IEEE Transactions on Intelligent Transportation Systems, vol. 11, No. 1, Mar. 2010, pp. 28-39.
Erlien, et al., "Incorporating Non-Linear Tire Dynamics into a Convex Approach to Shared Steering Dontrol," 2014 American Control Conference, Portland, OR, Jun. 4-6, 2014, pp. 3468-3473.
Erlien, et al., "Safe Driving Envelopes for Shared Control of Ground Vehicles", IFAC Proceedings Volumes, vol. 46, Issue 21, 2013, pp. 831-836, ISSN 1474-6670, ISBN 9783902823489, https://doi.org/10.3182/20130904-4-JP-2042.00096.
Erlien, et al., "Shared Steering Control Using Safe Envelopes for Obstacle Avoidance and Vehicle Stability", IEEE Transactions on Intelligent Transportation Systems, vol. 17, No. 2, Feb. 2016, pp. 441-451.
Erlien, et al., "Shared Vehicle Control Using Safe Driving Envelopes for Obstacle Avoidance and Stability", thesis, Stanford University, Mar. 2015.
Falkena, et al., "Investigation of Practical Flight Envelope Protection Systems for Small Aircraft", In Proceedings of AIAA Guidance, Navigation, and Control Conference, Toronto, Canada, 2010, pp. 1-13.
Fielding, et al., "Advanced Techniques for Clearance of Flight Control Laws", vol. 283 of Lecture Notes in Control and Information Sciences, Springer, 2003.
Funke, "Collision Avoidance up to the Handling Limits for Autonomous Vehicles", thesis, Stanford University, Oct. 2015.
Funke, et al., "Collision Avoidance and Stabilization for Autonomous Vehicles in Emergency Scenarios", IEEE Transactions on Control Systems Technology, vol. 25, No. 4, Jul. 2017, pp. 1204-1216.
Funke, et al., "Prioritizing Collision Avoidance and Vehicle Stabilization for Autonomous Vehicles", 2015 IEEE Intelligent Vehicles Symposium (IV), Seoul, Jun. 28-Jul. 1, 2015, pp. 1134-1139.
Funke, et al., "Simple Clothoid Paths for Autonomous Vehicle Lane Changes at the Limits of Handling", Proceedings of the ASME 2013 Dynamic Systems and Control Conference, DSCC2013, Oct. 21-23, 2013, pp. 1-10.
Funke, et al., "Up to the Limits: Autonomous Audi TTS", 2012 IEEE Intelligent Vehicles Symposium, Alcala de Henares, Spain, Jun. 3-7, 2012, pp. 541-547.
Gao, et al., "Predictive Control of Autonomous Ground Vehicles With Obstacle Avoidance on Slippery Roads", Dynamic Systems and Control Conference, 2010.
Gao, et al., "Spatial Predictive Control for Agile Semi-Autonomous Ground Vehicles", International Symposium on Advanced Vehicle Control, 2012.
Gerdes, et al., "Implementable Ethics for Autonomous Vehicles", In: Maurer M., Gerdes J., Lenz B., Winner H. (eds) Autonomous Driving. Springer, Berlin, Heidelberg, 2016.
Gray, et al., "Predictive Control for Agile Semi-Autonomous Ground Vehicles using Motion Primitives", American Control Conference (ACC), pp. 4239-4244, Jun. 2012.
Horn, et al., "Flight Envelope Limit Detection and Avoidance for Rotorcraft", Journal of the American Helicopter Society, vol. 47(4), pp. 253-262, 2002.
Horn, et al., "Flight Envelope Cueing on a Tilt-Rotor Aircraft Using Neural Network Limit Prediction", Journal of the American Helicopter Society, vol. 46(1), pp. 23-31, Jan. 2001.
Kawabe, et al., "An Optimal Path Generator Using a Receding Horizon Control Scheme for Intelligent Automobiles", IEEE International Conference on Control Applications, Taipei, Taiwan, Sep. 2-4, 2004.
La Civita, et al., "Integrated Modeling and Robust Control for Full-Envelope Flight of Robotic Helicopters," 2003 IEEE International Conference on Robotics and Automation, vol. 1, 2003, pp. 552-557.
Lane, et al., "Flight Control Design Using Non-Linear Inverse Dynamics", Automatica, vol. 24, No. 4, 1988, pp. 471-483, ISSN 0005-1098.
Lapp, et al., "Model Predictive Control Based Trajectory Optimization for Nap-of-the-Earth (NOE) Flight Including Obstacle Avoidance", Proceedings of the 2004 American Control Conference, vol. 1, Boston, MA, 2004, pp. 891-896.
Lee, et al., "Automated Driving Control in Safe Driving Envelope based on Probabilistic Prediction of Surrounding Vehicle Behaviors", SAE Int. J. Passeng. Cars—Electron. Electr. Syst. / vol. 8, Issue 1, May 2015, pp. 207-218.
Lombaerts, et al., "Pseudo Control Hedging and its Application for Safe Flight Envelope Protection", AIAA Guidance, Navigation, and Control Conference, Toronto, Canada, Aug. 2-5, 2010, pp. 1-17.
North, "Finding Common Ground In Envelope Protection Systems", Aviation Week & Space Technology, 153(9):66, Aug. 2000.
Pacejka, "Tire Characteristics and Vehicle Handling and Stability", Tire and Vehicle Dynamics, DOI: 10.1016/B978-0-08-097016-5.00001-2, Published by Elsevier Ltd., 2012.

\* cited by examiner

SYSTEMS AND METHODS FOR VISUALLY DISPLAYING A CURRENT STATE OF A VEHICLE IN REGARDS TO OPERATIONAL CONSTRAINTS OF THE VEHICLE

TECHNICAL FIELD

The present disclosure relates to systems and methods of a vehicle for visually displaying a current state of a vehicle in regards to operational constraints of the vehicle.

BACKGROUND

Drivers may often be unaware of a vehicle's operational constraints and/or contextual constraints of an environment while driving. A driver may unmindfully make driving decisions that near or exceed the vehicle's operational constraints which may result in a vehicle catastrophe of some sort. Furthermore, the driver may not have complete awareness of his/her contextual environment.

BRIEF SUMMARY OF EMBODIMENTS

According to various embodiments in the disclosed technology, the present vehicle uses operational information and contextual information to determine a vehicle's operational constraints and contextual constraints given the vehicle's current vehicle state. The current vehicle state may include a current set of values of operational parameters (i.e., operational information) for a point in time. The determined vehicle's operational constraints and contextual constraints may be displayed upon a visual display unit. Therefore, the driver viewing a displayed visualization of the vehicle's operational constraints may assist the driver with driving decisions to maintain vehicle stability. Furthermore, the driver may benefit from viewing a displayed visualization of the vehicle's environmental constraints being the driver may not be aware of some aspects of his/her contextual environment.

One aspect of the present disclosure relates to a vehicle configured for visually displaying a current state of a vehicle in regards to operational constraints of the vehicle. The vehicle may include one or more hardware processors configured by machine-readable instructions. Sensors may be configured to generate output signals conveying operational information regarding the vehicle. The operational information may include values of operational parameters of the vehicle. A visual display unit may be configured to visually present information. The processor(s) may be configured to determine, based on the output signals, the operational information. The processor(s) may be configured to determine, based on the operational information, a current vehicle state of the vehicle. The current vehicle state may represent current values of the operational parameters of the vehicle. The processor(s) may be configured to determine, based on the operational information, predicted boundaries of the current vehicle state. A breach of the predicted boundaries of the current vehicle state may indicate undesirable values of the operational parameters of the vehicle such that the values are nearing the operational constraints of the vehicle. The processor(s) may be configured to determine a metric value of a metric representing a difference between the current vehicle state and the predicted boundaries of the current vehicle state. The processor(s) may be configured to effectuate display of the metric upon the visual display unit. The sensors may be configured to generate output signals conveying contextual information. The processor(s) may be configured to determine, based on the output signals, the contextual information. The processor(s) may be configured to determine, based on the operational information and contextual information, predicted thresholds of a trajectory metric. The processor(s) may be configured to determine, based on the contextual information, a value of the trajectory metric. The value of the trajectory metric may represent a target position along a trajectory of the vehicle. The processor(s) may be configured to effectuate display of the trajectory metric upon the visual display unit. The processor(s) may be configured to control the vehicle. Controlling the vehicle may be based on the metric and the trajectory metric. Controlling the vehicle may maximize the predicted boundaries of the current vehicle state and the value of the trajectory metric may not breach the predicted thresholds. The processor(s) may be configured to control the vehicle wholly or partly.

As used herein, the term "determine" (and derivatives thereof) may include measure, calculate, compute, estimate, approximate, generate, and/or otherwise derive, and/or any combination thereof.

Another aspect of the present disclosure relates to a method for visually displaying a current state of a vehicle in regards to operational constraints of the vehicle. The method may include generating output signals conveying operational information regarding the vehicle. The operational information may include values of operational parameters of the vehicle. The method may include visually presenting information. The method may include determining, based on the output signals, the operational information. The method may include determining, based on the operational information, a current vehicle state of the vehicle. The current vehicle state may represent current values of the operational parameters of the vehicle. The method may include determining, based on the operational information, predicted boundaries of the current vehicle state. A breach of the predicted boundaries of the current vehicle state may indicate undesirable values of the operational parameters of the vehicle such that the values are nearing the operational constraints of the vehicle. The method may include determining a metric value of a metric representing a difference between the current vehicle state and the predicted boundaries of the current vehicle state. The method may include effectuating display of the metric upon the visual display unit. The method may include generating output signals conveying contextual information. The method may include determining, based on the output signals, the contextual information. The method may include determining, based on the operational information and contextual information, predicted thresholds of a trajectory metric. The method may include determining, based on the contextual information, a value of the trajectory metric. The value of the trajectory metric may represent a target position along a trajectory of the vehicle. The method may include effectuating display of the trajectory metric upon the visual display unit. The method may include controlling the vehicle. Controlling the vehicle may be based on the metric and the trajectory metric. Controlling the vehicle may maximize the predicted boundaries of the current vehicle state and the value of the trajectory metric may not breach the predicted thresholds. The method may include controlling the vehicle wholly or partly.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

The technology disclosed herein, in accordance with one or more various implementations, is described in detail with reference to the following figures. The figures are provided for purposes of illustration only and merely depict typical or example implementations of the disclosed technology. These figures are provided to facilitate the reader's understanding of the disclosed technology and shall not be considered limiting of the breadth, scope, or applicability thereof. It should be noted that for clarity and ease of illustration these figures are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Figure 1:
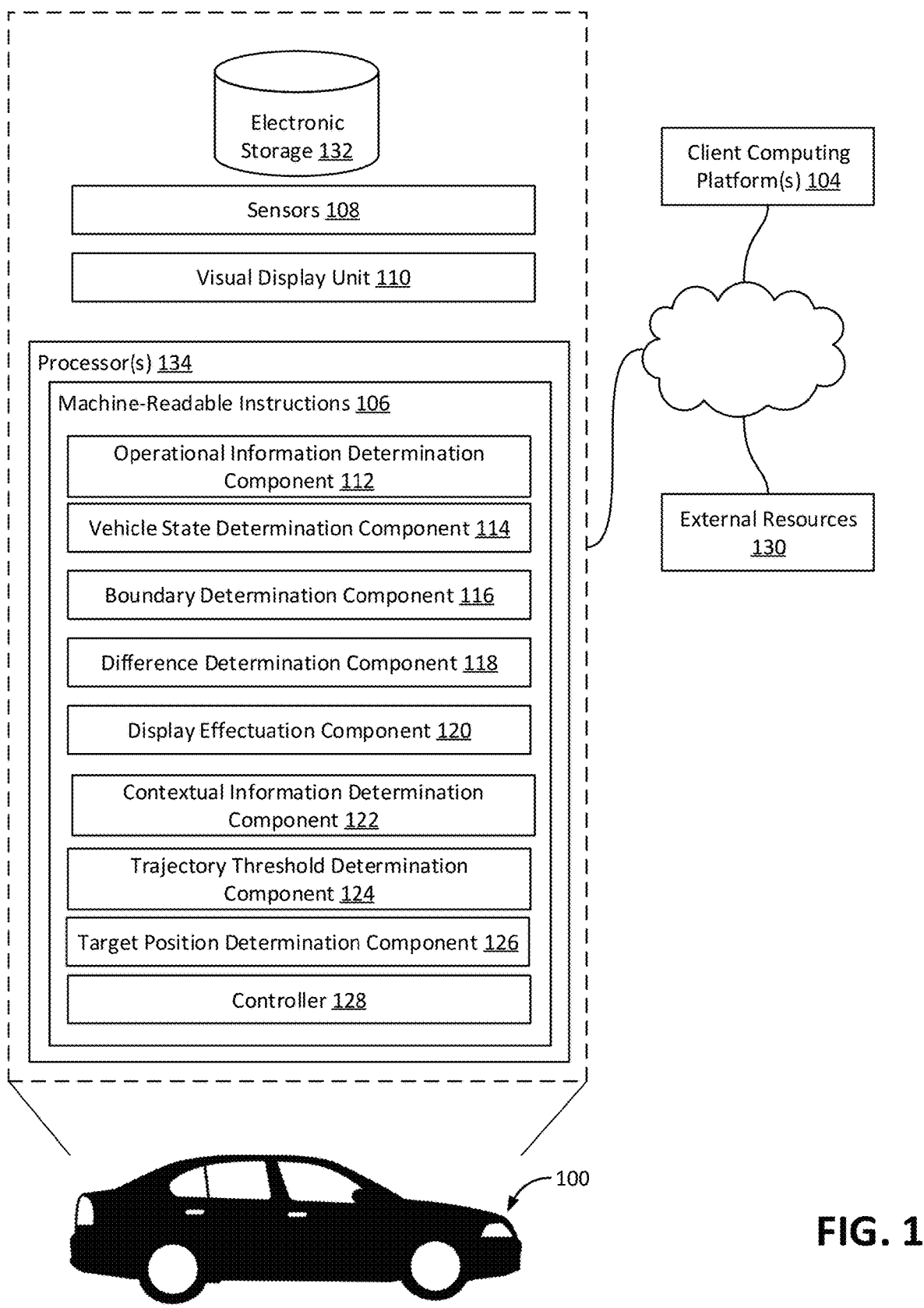
FIG. 1 illustrates a vehicle configured for visually displaying a current state of a vehicle in regards to operational constraints of the vehicle, in accordance with one or more implementations.

FIG. 1 illustrates a vehicle 100 configured for visually displaying a current state of a vehicle in regards to operational constraints of the vehicle, in accordance with one or more implementations. In some implementations, vehicle 100 may include sensors 108, visual display unit 110, electronic storage 132, processor(s) 134, and/or other components. Vehicle 100 may be configured to communicate with one or more client computing platforms 104 according to a client/server architecture and/or other architectures. In some implementations, users may access vehicle 100 via client computing platform(s) 104.

Sensors 108 may be configured to generate output signals conveying operational information regarding the vehicle. The operational information may include values of operational parameters of the vehicle. The operational parameters of vehicle 100 may include yaw rate, sideslip velocities, slip angles, percent slip, frictional forces, degree of steer, heading, trajectory, front slip angle corresponding to full tire saturation, rear slip angle corresponding to full tire saturation, maximum stable steering angle given speed/friction, gravitational constant, coefficient of friction between vehicle 100 tires and roadway, distance from center of gravity of vehicle 100 to front axle, distance from center of gravity of vehicle 100 to rear axle, total mass of vehicle 100, total longitudinal force, rear longitudinal force, front longitudinal force, total lateral force, rear lateral force, front lateral force, longitudinal speed, lateral speed, longitudinal acceleration, brake engagement, steering wheel position, time derivatives of steering wheel position, throttle, time derivatives of throttle, gear, exhaust, revolutions per minutes, mileage, emissions, and/or other operational parameters of vehicle 100. In some implementations, at least one of sensors 108 may be a vehicle system sensor included in an engine control module (ECM) system or an electronic control module (ECM) system of vehicle 100. Combinations and derivations of information (or of parameters reflecting the information) are envisioned within the scope of this disclosure. For example, in some implementations, the current operational information may include yaw rate and/or its derivative for a particular user within vehicle 100.

In some implementations, sensors 108 may include, by way of non-limiting example, one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, global positioning system sensors, a tilt sensor, a motion sensor, a vibration sensor, an image sensor, a camera, a depth sensor, a distancing sensor, an ultrasonic sensor, an infrared sensor, a light sensor, a microphone, an air speed sensor, a ground speed sensor, an altitude sensor, medical sensors (including but not limited to blood pressure sensor, pulse oximeter, heart rate sensor, etc.), degree-of-freedom sensors (e.g. 6-DOF and/or 9-DOF sensors), a compass, and/or other sensors. As used herein, the term "sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files. In some implementations, output signals generated by individual sensors (and/or information based thereon) may be streamed to one or more other components of vehicle 100.

Sensors 108 may be configured to generate output signals conveying contextual information. The contextual information may characterize a contextual environment surrounding the vehicle. The contextual environment may be defined by parameter values for one or more contextual parameters. The contextual parameters may include one or more characteristics of a fixed or moving obstacle (e.g., size, relative position, motion, object class (e.g., car, bike, pedestrian, etc.), etc.), number of lanes on the roadway, direction of traffic in adjacent lanes, relevant traffic signs and signals, one or more characteristics of the vehicle (e.g., size, relative position, motion, object class (e.g., car, bike, pedestrian, etc.), etc.), direction of travel of the vehicle, lane position of the vehicle on the roadway, time of day, ambient conditions, topography of the roadway, obstacles in the roadway, and/or others. The roadway may include a city road, urban road, highway, onramp, and/or offramp. Lane position of a vehicle on a roadway, by way of non-limiting example, may be that the vehicle is in the far left lane of a four lane highway. The topography may include changes in elevation and/or grade of the roadway. Obstacles may include one or more of other vehicles, pedestrians, bicyclists, motorcyclists, a tire shred from a previous vehicle accident, and/or other obstacles that a vehicle may need to avoid. Traffic conditions may include slowed speed of a roadway, increased speed of a roadway, decrease in number of lanes of a roadway, increase in number of lanes of a roadway, increase volume of vehicles on a roadway, and/or others. Ambient conditions may include external temperature, rain, hail, snow, fog, and/or other naturally occurring conditions.

In some implementations, sensors 108 may include virtual sensors, imaging sensors, depth sensors, cameras, and/or other sensors. As used herein, the term "camera", "sensor" and/or "image sensor" may include any device that captures images, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, and/or other information. Information captured by one or more sensors may be marked, timestamped, annotated, and/or otherwise processed such that information captured by other sensors can be synchronized, aligned, annotated, and/or otherwise associated therewith. For example, contextual information captured by an image sensor may be synchronized with information captured by an accelerometer or other sensor. Output signals generated by individual image sensors (and/or information based thereon) may be stored and/or transferred in electronic files.

In some implementations, an image sensor may be integrated with electronic storage, e.g., electronic storage 132, such that captured information may be stored, at least initially, in the integrated embedded storage of a particular vehicle, e.g., vehicle 100. In some implementations, one or more components carried by an individual vehicle may include one or more cameras. For example, a camera may include one or more image sensors and electronic storage media. In some implementations, an image sensor may be configured to transfer captured information to one or more components of the system, including but not limited to remote electronic storage media, e.g. through "the cloud."

Visual display unit 110 may be configured to visually present information. The display of the metric and/or trajectory metric may include colors, sounds, shapes, and/or other presentments of indications of constraints of the vehicle. The colors may include solid colors and/or color gradients. By way of non-limiting example, visual display unit 110 may include a heads up display, mobile devices of the driver and/or passengers, a dashboard of vehicle 100, user interfaces of vehicle 100, graphical user interfaces of vehicle 100, sound systems of vehicle 100, and/or other display units.

Vehicle 100 may be configured by machine-readable instructions 106. Machine-readable instructions 106 may include one or more instruction components. The instruction components may include computer program components. The instruction components may include one or more of operational information determination component 112, a vehicle state determination component 114, a boundary determination component 116, a difference determination component 118, a display effectuation component 120, contextual information determination component 122, a trajectory threshold determination component 124, a target position determination component 126, a controller 128, and/or other instruction components.

Operational information determination component 112 may be configured to determine the operational information. The operational information may be based on the output signals. Determination may include identifying the yaw rate, sideslip, slip angle, heading, and/or other operational information of vehicle 100 such that the values of all or some of the operational parameters are identified; identifying if operational parameter values have normal or abnormal quantities; identifying if operational parameter values have near abnormal quantities, identifying extreme excess or extreme deficiency of operational parameter values.

Vehicle state determination component 114 may be configured to determine a current vehicle state of the vehicle. The determination of the current vehicle state may be based on the operational information. The current vehicle state may represent a current set of values of a set of operational parameters of the vehicle. The current vehicle state may be indicative of the vehicle's stability at a point in time.

By way of non-limiting example, a current vehicle state may include operational parameters with values of speed of vehicle 100 at 10 m/s, friction of 0.55, and degrees of steering of 10 degrees. By way of non-limiting example, a current vehicle state may include operational parameters with values speed of vehicle 100 at 15 m/s, friction of 0.55, stable steering angle of 0 degrees given the speed and friction values. It is to be understood that the given values in this example are not intended to be limiting and the current vehicle state may be based on any value of speed of vehicle 100 and any value of friction.

Boundary determination component 116 may be configured to determine predicted boundaries of the current vehicle state. Determination of the predicted boundaries may be based on the operational information. A breach of the predicted boundaries of the current vehicle state may indicate undesirable values of the operational parameters of the vehicle such that the values are nearing the operational constraints of the vehicle. A breach of the predicted boundaries of the current vehicle state may include exceeding one or more values of the operational parameters or calculated values based on values of the operational parameters. Nearing and/or exceeding the operational constraints of the vehicle may cause the vehicle and/or a driver of the vehicle to lose vehicle stability, lose vehicle control, cause a collision, and/or other vehicle catastrophes. In some implementations, front lateral force may influence control of the vehicle (i.e., controller 128). In implementations where front lateral force influences control, the front lateral force and the slew rate of front lateral force may be bounded constraints. In some implementations, front steering angle may influence controller 128 in addition to the metric and the trajectory metric. The influence of the front steering angle may be directly controllable.

In some implementations, the predicted boundaries may form a shape. The shape may be a Nullcline Boundary that may limit the yaw rate while allowing transient overshoot dynamics with regards to vehicle stability. A nullcline linearized at a differentiated yaw rate of zero at a max stable steering angle may encapsulate a majority of the stable open loop trajectories (i.e., output has no affect) of vehicle 100 in the yaw direction and may correspond to a line. With the nullcline as the predicted boundaries, the yaw rate may be able to grow to its stable maximum with natural overshoot of vehicle 100's stability such that values of the operational parameters of a current vehicle state are desirable. In some implementations, the value of the steering angle does not affect the predicted boundaries if the value of speed of vehicle 100 and the value of friction are kept constant. Some predicted boundaries may be determined by the value of the maximum rear slip angle operational parameter. Furthermore, some predicted boundaries may be determined by the linear approximation of the differentiated yaw rate at a max stable steering angle. In some implementations, the predicted boundaries may change with speed of vehicle 100 and the value of friction. In some implementations, the predicted boundaries may cease to exist as speed of vehicle 100 and the value of friction approach zero.

By way of non-limiting example, the predicted boundaries may be boundary lines forming the shape of a parallelogram upon a 2-dimensional phase plane with x-axis yaw rate (deg/s) and y-axis sideslip (deg). One set of boundaries that are opposite of each other may be yaw rate, and the other set of boundaries that are opposite of each other may be sideslip. The set of boundaries representing yaw rate may be defined by one or more equations that utilize the values of the operational parameters. The values of the operational parameters may include front slip angle corresponding to full tire saturation, rear slip angle corresponding to full tire saturation, longitudinal speed, maximum stable steering angle given speed/friction, gravitational constant, coefficient of friction between vehicle 100 tires and roadway, distance from center of gravity of vehicle 100 to front axle, distance from center of gravity of vehicle 100 to rear axle, and/or other operational parameters. It is to be understood that the phase plane plot with the predicted boundaries of the operational constraints of vehicle 100 may be used to determine a metric value of a metric such that a driver may comprehend the operational constraints of vehicle 100.

Difference determination component 118 may be configured to determine a metric value of a metric. The metric value may represent a difference between the current vehicle state and the predicted boundaries of the current vehicle state. The current vehicle state may represent a set of values of the operational parameters within the predicted boundaries, near the predicted boundaries, at the predicted boundaries, or past the predicted boundaries. The determined metric value may be indicative of how close the current vehicle state may be to the predicted boundaries and/or breaching the predicted boundaries. Determining the metric value of the metric may include translating, generating, calculating, and/or other techniques such that the metric value may be comprehendible by a driver and/or reader of the metric values of the metric.

Display effectuation component 120 may be configured to effectuate display of the metric upon visual display unit 110. Effectuation of display of the metric upon visual display unit 110 may provide insight to a driver about vehicle 100 relative to the predicted boundaries such that the driver may comprehend which and/or when his driving decisions make vehicle 100 and/or himself more likely to be in vehicle catastrophes.

Figure 3A:
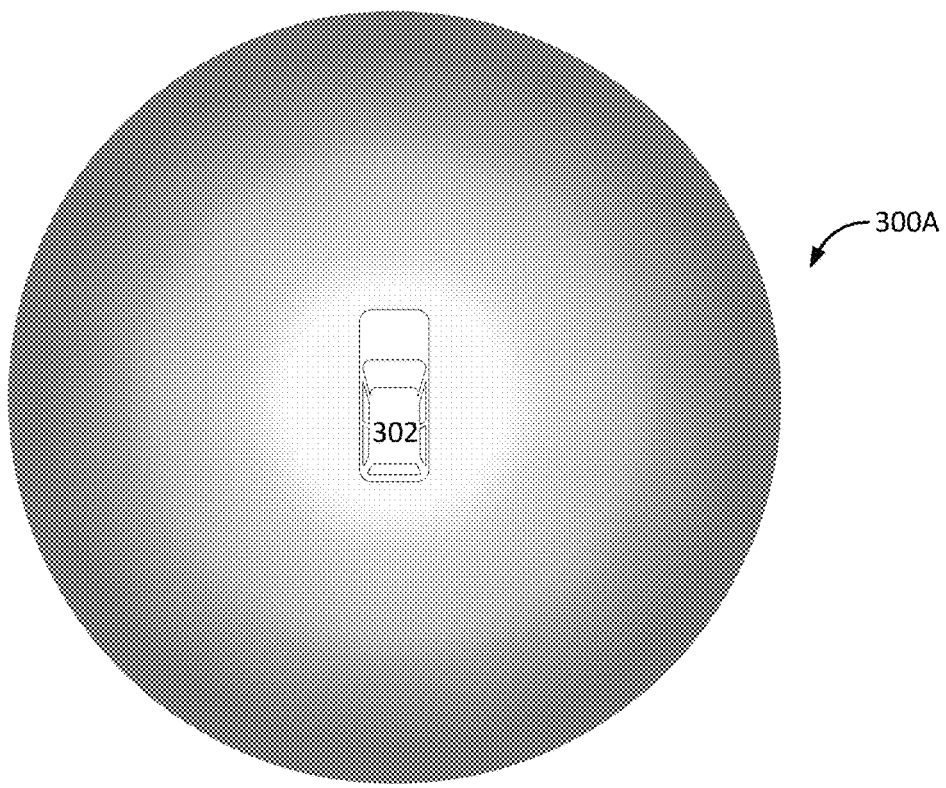
FIG. 3A illustrates a display of a current state of a vehicle in regards to operational constraints of the vehicle, in accordance with one or more implementations.
Figure 3B:
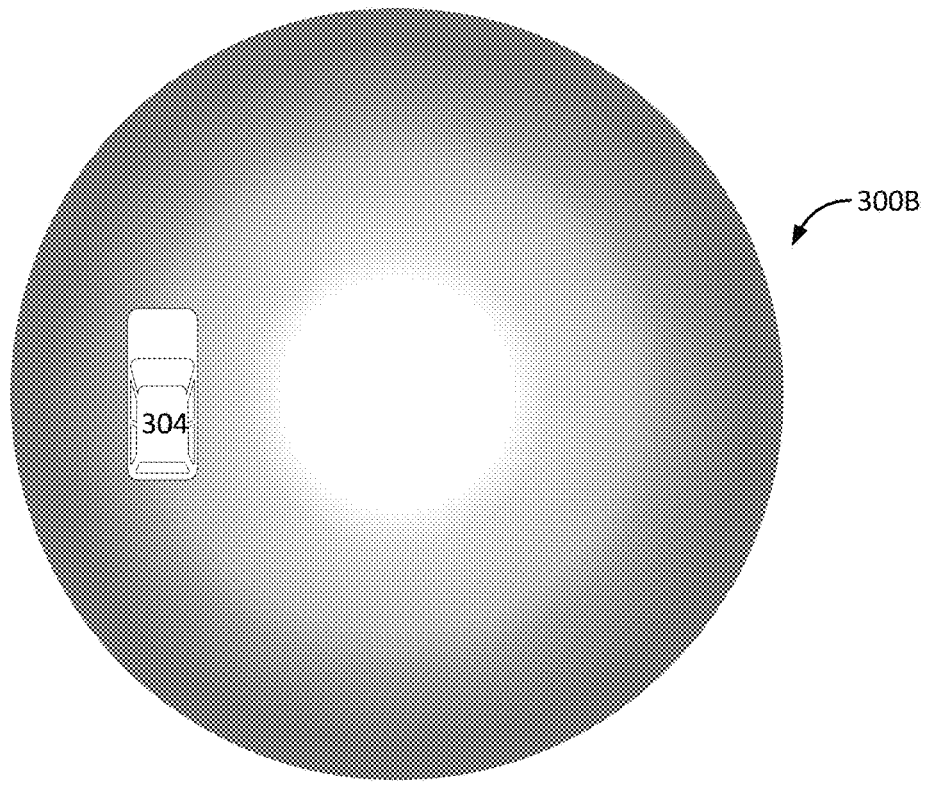
FIG. 3B illustrates a display of a current state of a vehicle in regards to operational constraints of the vehicle, in accordance with one or more implementations.

By way of non-limiting example, FIGS. 3A and 3B illustrate displays of a current state of a vehicle in regards to operational constraints of the vehicle, in accordance with one or more implementations. Circle displays 300A and 300B of FIG. 3A and FIG. 3B, respectively, include gradient coloring. The gradient begins as white in the center of circle displays 300A and 300B and gradually gets darker towards the perimeters. The darker and further the position of a virtual representation of vehicle 100 (i.e., virtual vehicle 302 and 304) is in the circle displays, the more vehicle 100 is nearing its operational constraints.

FIG. 3A illustrates circle display 300A representing the predicting boundaries (i.e., operational constraints) of vehicle 100, wherein vehicle 100 is represented in circle display 300A by virtual vehicle 302. Vehicle 302 is in the center of circle display 300A where it is white indicating that vehicle 100 is not nearing any operational constraints and/or vehicle 100 is stable.

FIG. 3B illustrates circle display 300B representing the predicting boundaries (i.e., operational constraints) of vehicle 100, wherein vehicle 100 is represented in circle display 300B by virtual vehicle 304. Vehicle 304 is further to the left of circle display 300B where it is darker indicating that vehicle 100 is nearing at least some operational constraints and/or vehicle 100 is not stable or is less stable. The positioning of virtual vehicle 304 further on the left side of circle display 300B may indicate vehicle 100 is near operational constraints as vehicle 100 steers to the right at a higher degree of steer.

Referring to FIG. 1, contextual information determination component 122 may be configured to determine the contextual information. The contextual information may characterize the surrounding contextual environment of the vehicle. Determination of the contextual information may be based on the output signals. Determination of the contextual information may include identifying obstacles, identifying motion of obstacles, estimating distances between vehicle 100 and other vehicles, identifying lane markings, identifying traffic lane markings, identifying traffic signs and signals, identifying crosswalk indicators, identifying upcoming curvature of the roadway, and/or other determinations. Determination of the contextual information may include identify ambient conditions such as temperature, rain, snow, hail, fog, and/or other ambient conditions that may affect control of vehicle 100.

In some implementations, contextual information determined by contextual information determination component 122 may be stored in electronic storage 132. In some implementations, the contextual information may be store temporarily such as until a drive is over, until the end of the day, until the end of the week, until the end of the month, until the end of the year, or until it is manually cleared.

Trajectory threshold determination component 124 may be configured to determine predicted threshold values of a trajectory metric. Determination may be based on the contextual information and the operational information. The trajectory metric may characterize a trajectory of the vehicle such that the vehicle is traveling on a roadway. The predicted threshold values of the trajectory metric may represent desirable circumventions in order to avoid causing vehicle catastrophes. Vehicle catastrophes may include a collision, losing control of the vehicle, losing vehicle stability, and/or other vehicle catastrophes. By way of non-limiting example, the predicted thresholds of the trajectory metric account for obstacles in the roadway, lane boundaries, roadway boundaries, vehicle width, and/or other predicted thresholds of the trajectory metric. Roadway boundaries may include guardrails, center medians, specific lane markings, parked vehicles, pedestrians, curbs, sidewalks, opposing direction of travel, concrete barriers, barriers of other materials, traffic cones, and/or other roadway boundaries. Vehicle width may be accounted for when determining the predicted threshold values such that obstacles and/or boundaries may be laterally closer in proximity to a wider vehicle.

By way of non-limiting example, contextual information characterizing the contextual environment of vehicle 100 may include values of contextual parameters including direction of travel is North, roadway is three lanes, no roadway shoulder, guardrails constrain the roadway, vehicle 100 is in middle lane, there is secondary vehicle ahead of vehicle 100 in the lane to the left. Determined predicted threshold values of the trajectory metric may include considering the guardrails of the roadway, the secondary vehicle nearby, and/or the lane boundaries of the roadway.

Target position determination component 126 may be configured to determine, in an ongoing manner, a value of the trajectory metric. The value of the trajectory metric may represent a target position along the trajectory of the vehicle. The target position may be a position on the roadway the vehicle is traveling towards. Determination may be based on the contextual information and the operational information.

By way of non-limiting example, vehicle 100 may be a wide truck and may be traveling down a 3-lane roadway and currently in the far left lane. A predicted threshold value of the trajectory metric may indicate that vehicle 100 should lane change to the middle lane. The lane change may be based on the determined predicted threshold values such that the vehicle width of vehicle 100 is considered in addition to the lack of a left shoulder on the roadway where there is just a guardrail.

Display effectuation component 120 may further be configured to effectuate display of the trajectory metric upon the visual display unit. The display of the trajectory metric may include values representing target positions and/or predicted threshold values. Effectuation may include solid colors and/or gradient colors indicative of desirable values of the trajectory metric and/or undesirable values of the trajectory metric. Upon effectuation such that a driver may visually see desirable and/or undesirable values (i.e., the determined predicted threshold values) of the trajectory metric, the driver may base his/her driving decisions on the values of the trajectory metric. In some implementations, the values of the trajectory metric may be displayed such that the driver does not have remove his/her eyes from the road and the values of the trajectory metric look as if they are displayed on the roadway ahead. Furthermore, the trajectory metric may be displayed in, by way of non-limiting example, colors such that the driver of vehicle 100 may visually see that the more he/she decides to maneuver to the left of the roadway, the more red the roadway appears than the middle lane. It may appear to be redder the further left he/she decides to maneuver because vehicle 100 is a wide truck and there is no left shoulder on the roadway, which minimizes proximity to the physical boundary of the roadway and may increase likelihood of, for example, driving into opposing traffic.

In some implementations, display effectuation component 120 may be configured to effectuate display of the trajectory metric in addition to the metric representing the difference between the current vehicle state and the predicted boundaries, upon visual display unit 110. Upon the driver's ability to visually see the trajectory metric and/or the metric, the driver may be more inclined to make desirable driving decisions.

Controller 128 may be configured to control the vehicle such that the predicted boundaries of the current vehicle state are maximized and the value of the trajectory metric does not breach the predicted thresholds. Controlling the vehicle may be based on the metric and/or the trajectory metric. In some implementations, controller 128 may be configured to control, based on the metric and/or the trajectory metric, the vehicle wholly. Implementations where controller 128 controls the vehicle wholly include autonomous driving modes such that one or more passengers may or may not be present inside vehicle 100. In some implementations, controller 128 may be configured to control, based on the metric and/or the trajectory metric, the vehicle partly. Implementations where controller 128 controls the vehicle party include assisted/guided driving modes such that the driver maintains a majority of the control of the vehicle and controller 128 guides some controlling aspects. In some implementations, front lateral force may influence controller 128 in addition to the metric and the trajectory metric, wherein front lateral force is indirectly actuated through the value of the steering angle operational parameter. The influence of front lateral force may convexify the nonlinearities of the front tire. In some implementations, front steering angle may influence controller 128 in addition to the metric and the trajectory metric. The influence of the front steering angle may be directly controllable.

By way of non-limiting example, vehicle 100 may be operating autonomously transporting passengers to a destination. Controller 128 may utilize the values of the metric and trajectory metric to control the autonomously-operated vehicle 100. Controller 128 may be configured to control vehicle 100 based on the determined predicted thresholds of the roadways, obstacles, operational parameter values, and/or operational constraints.

By way of non-limiting example, vehicle 100 may be operated by a driver transporting to a destination. Controller 128 may utilize the values of the metric and trajectory metric to correct the driver's driving decisions and decrease vehicle speed and degree of steer upon determination that, for example, vehicle 100 was traveling too fast on a round onramp to a highway such that vehicle 100 may rollover.

In some implementations, vehicle 100, client computing platform(s) 104, and/or external resources 130 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which vehicle 100, client computing platform(s) 104, and/or external resources 130 may be operatively linked via some other communication media.

A given client computing platform 104 may include one or more processors configured to execute computer program components. The computer program components may be configured to enable an expert or user associated with the given client computing platform 104 to interface with vehicle 100 and/or external resources 130, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 130 may include sources of information outside of vehicle 100, external entities participating with vehicle 100, and/or other resources. In some implementations, some or all of the functionality attributed herein to external resources 130 may be provided by resources included in vehicle 100.

Vehicle 100 may include electronic storage 132, one or more processors 134, and/or other components. Vehicle 100 may include communication lines, or ports to enable the exchange of information with a network and/or other computing platforms. Illustration of vehicle 100 in FIG. 1 is not intended to be limiting. Vehicle 100 may include a plurality of hardware, software, and/or firmware components operating together to provide the functionality attributed herein to vehicle 100. For example, vehicle 100 may be implemented by a cloud of computing platforms operating together as vehicle 100.

Electronic storage 132 may comprise non-transitory storage media that electronically stores information. The electronic storage media of electronic storage 132 may include one or both of system storage that is provided integrally (i.e., substantially non-removable) with vehicle 100 and/or removable storage that is removably connectable to vehicle 100 via, for example, a port (e.g., a USB port, a firewire port, etc.) or a drive (e.g., a disk drive, etc.). Electronic storage 132 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 132 may include one or more virtual storage resources (e.g., cloud storage, a virtual private network, and/or other virtual storage resources). Electronic storage 132 may store software algorithms, information determined by processor(s) 134, information received from vehicle 100, information received from client computing platform(s) 104, and/or other information that enables vehicle 100 to function as described herein.

Processor(s) 134 may be configured to provide information processing capabilities in vehicle 100. As such, processor(s) 134 may include one or more of a digital processor, an analog processor, a digital circuit designed to process information, an analog circuit designed to process information, a state machine, and/or other mechanisms for electronically processing information. Although processor(s) 134 is shown in FIG. 1 as a single entity, this is for illustrative purposes only. In some implementations, processor(s) 134 may include a plurality of processing units. These processing units may be physically located within the same device, or processor(s) 134 may represent processing functionality of a plurality of devices operating in coordination. Processor(s) 134 may be configured to execute components 112, 114, 116, 118, 120, 122, 124, 126, and/or 128, and/or other components. Processor(s) 134 may be configured to execute components 112, 114, 116, 118, 120, 122, 124, 126, and/or 128, and/or other components by software; hardware; firmware; some combination of software, hardware, and/or firmware; and/or other mechanisms for configuring processing capabilities on processor(s) 134. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 112, 114, 116, 118, 120, 122, 124, 126, and/or 128 are illustrated in FIG. 1 as being implemented within a single processing unit, in implementations in which processor(s) 134 includes multiple processing units, one or more of components 112, 114, 116, 118, 120, 122, 124, 126, and/or 128 may be implemented remotely from the other components. The description of the functionality provided by the different components 112, 114, 116, 118, 120, 122, 124, 126, and/or 128 described below is for illustrative purposes, and is not intended to be limiting, as any of components 112, 114, 116, 118, 120, 122, 124, 126, and/or 128 may provide more or less functionality than is described. For example, one or more of components 112, 114, 116, 118, 120, 122, 124, 126, and/or 128 may be eliminated, and some or all of its functionality may be provided by other ones of components 112, 114, 116, 118, 120, 122, 124, 126, and/or 128. As another example, processor(s) 134 may be configured to execute one or more additional components that may perform some or all of the functionality attributed below to one of components 112, 114, 116, 118, 120, 122, 124, 126, and/or 128.

Figure 2:
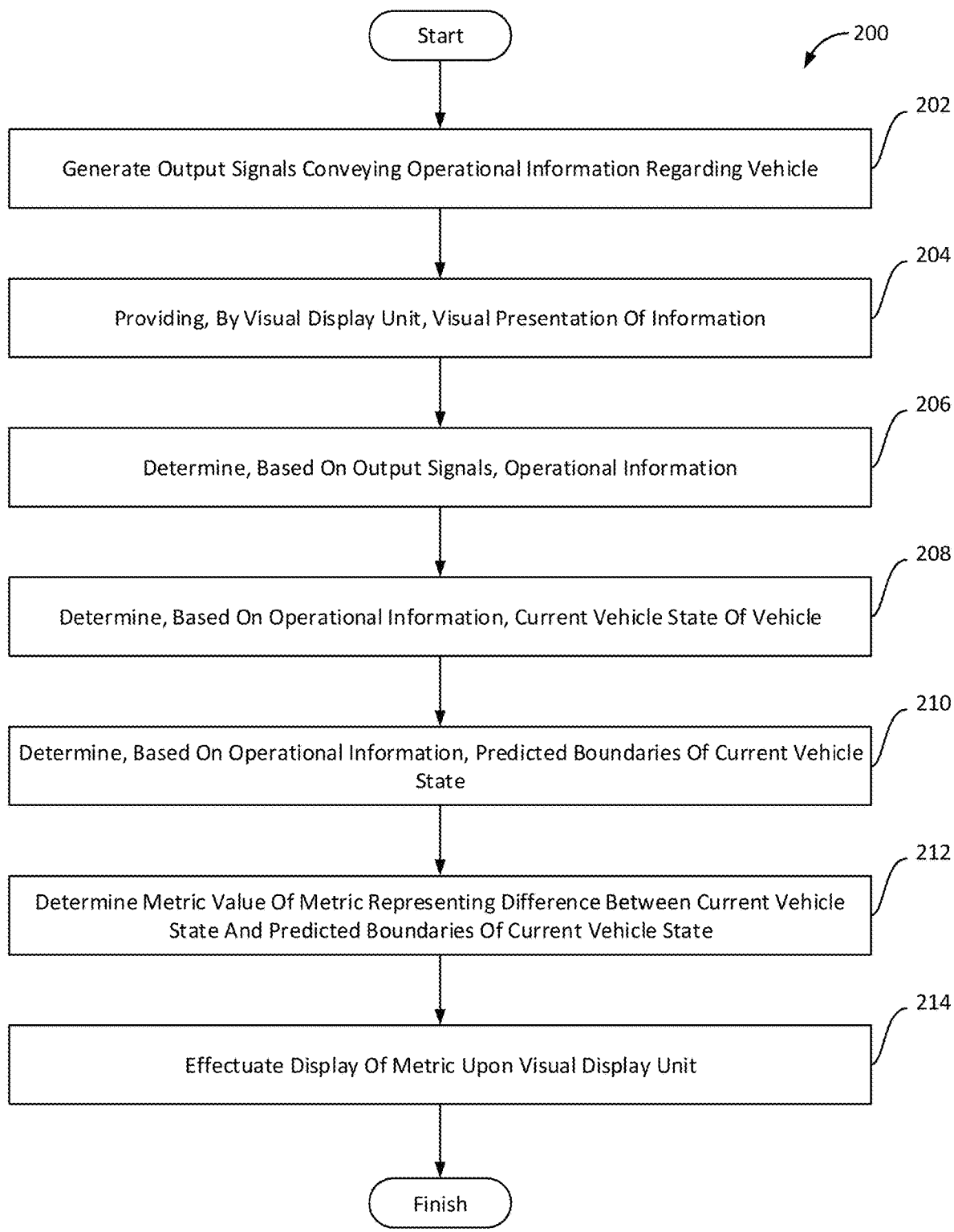
FIG. 2 illustrates a method for visually displaying a current state of a vehicle in regards to operational constraints of the vehicle, in accordance with one or more implementations.

FIG. 2 illustrates a method 200 for visually displaying a current state of a vehicle in regards to operational constraints of the vehicle, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include generating output signals conveying operational information regarding the vehicle. The operational information may include values of operational parameters of the vehicle. Operation 202 may be performed by one or more hardware processors configured by machine-readable instructions including a component that is the same as or similar to sensors 108, in accordance with one or more implementations.

An operation 204 may include providing, by a visual display unit, visual presentation of information. Operation 204 may be performed by one or more hardware processors configured by machine-readable instructions including a component that is the same as or similar to visual display 110, in accordance with one or more implementations.

An operation 206 may include determining the operational information. The determination of the operational information may be based on the output signals. Operation 206 may be performed by one or more hardware processors configured by machine-readable instructions including a component that is the same as or similar to operational information determination component 112, in accordance with one or more implementations.

An operation 208 may include determining a current vehicle state of the vehicle. The determination of the current vehicle state may be based on the operational information. The current vehicle state may represent current values of the operational parameters of the vehicle. Operation 208 may be performed by one or more hardware processors configured by machine-readable instructions including a component that is the same as or similar to vehicle state determination component 114, in accordance with one or more implementations.

An operation 210 may include determining predicted boundaries of the current vehicle state. The determination of the predicted boundaries may be based on the operational information. A breach of the predicted boundaries of the current vehicle state may indicate undesirable values of the operational parameters of the vehicle such that the values are nearing the operational constraints of the vehicle. Operation 210 may be performed by one or more hardware processors configured by machine-readable instructions including a component that is the same as or similar to boundary determination component 116, in accordance with one or more implementations.

An operation 212 may include determining a metric value of a metric representing a difference between the current vehicle state and the predicted boundaries of the current vehicle state. The determined difference may be indicative of how close the vehicle is to its operational constraints such that a vehicle catastrophe may occur. Operation 212 may be performed by one or more hardware processors configured by machine-readable instructions including a component that is the same as or similar to difference determination component 118, in accordance with one or more implementations.

An operation 214 may include effectuating display of the metric upon the visual display unit. Operation 214 may be performed by one or more hardware processors configured by machine-readable instructions including a component that is the same as or similar to display effectuation component 120 and visual display 110, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A vehicle for visually displaying a current state of the vehicle in regards to operational constraints of the vehicle, the vehicle comprising:
    one or more processors configured by machine-readable instructions to:
        characterize contextual parameters of the vehicle prior to the vehicle changing lanes on a roadway;
        determine, based on sensors, a predicted lateral force of the vehicle while the vehicle changes lanes on the roadway;
        determine a predicted vehicle state of the vehicle, the predicted vehicle state representing current values of the lateral force or slew rate of the lateral force of the vehicle in addition of the predicted lateral force of the vehicle while the vehicle changes lanes on the roadway;
        determine, based on the lateral force, predicted boundaries of the predicted vehicle state, wherein a breach of the predicted boundaries of the predicted vehicle state indicates undesirable values of the lateral force of the vehicle such that the lateral force is nearing operational constraints of the vehicle;
        determine a metric value of a metric representing a difference between the predicted vehicle state and the predicted boundaries of the current vehicle state; and
        effectuate display of the metric upon a visual display unit, wherein the display depicts the vehicle changing lanes on the roadway based on the predicted boundaries.

2. The vehicle of claim 1, wherein the one or more processors are further configured by machine-readable instructions to:
    generate the contextual parameters, the contextual parameters characterizing a contextual environment surrounding the vehicle.

3. The vehicle of claim 2, wherein the one or more processors are further configured by machine-readable instructions to:
    determine, based on the contextual parameters and the lateral force, predicted threshold values of a trajectory metric;
    determine in an ongoing manner, based on the contextual parameters and the lateral force, a value of the trajectory metric representing a target position along a trajectory of the vehicle; and
    effectuate display of the trajectory metric upon the visual display unit.

4. The vehicle of claim 3, wherein the thresholds of the trajectory metric account for obstacles in the roadway, lane boundaries, boundaries of the roadway, and/or vehicle width.

5. The vehicle of claim 3, wherein the one or more processors are further configured by machine-readable instructions to:
    control, based on the metric and the trajectory metric, the vehicle such that the predicted boundaries of the predicted vehicle state are maximized, the metric value of the metric is maximized, and/or the value of the trajectory metric does not breach the predicted threshold values of the trajectory metric.

6. The vehicle of claim 5, wherein the one or more processors are further configured by machine-readable instructions such that controlling, based on the metric and the trajectory metric, the vehicle includes controlling the vehicle wholly or partly.

7. The vehicle of claim 2, wherein the contextual environment includes direction of travel of the vehicle, number of lanes on the roadway, lane position of the vehicle on the roadway, position and motion of other vehicles, and/or obstacles in the roadway.

8. The vehicle of claim 3, wherein the display of the metric or the trajectory metric includes colors and/or sounds.

9. The vehicle of claim 1, wherein operational parameters of the vehicle include acceleration, brake engagement, yaw rate, sideslip, degree of steer, heading, and/or trajectory.

10. A method for visually displaying a current state of a vehicle in regards to operational constraints of the vehicle, the method comprising:
    generating output signals conveying a lateral force of the vehicle;
    providing, by a visual display unit, visual presentation of information;
    characterizing contextual parameters of the vehicle prior to the vehicle changing lanes on a roadway;
    determining, based on the output signals, a predicted lateral force of the vehicle while the vehicle changes lanes on the roadway;
    determining a predicted vehicle state of the vehicle, the predicted vehicle state representing current values of the lateral force or slew rate of the lateral force of the vehicle in addition of the predicted lateral force of the vehicle while the vehicle changes lanes on the roadway;
    determining, based on the lateral force, predicted boundaries of the predicted vehicle state, wherein a breach of the predicted boundaries of the predicted vehicle state indicates undesirable values of the lateral force of the vehicle such that the lateral force is nearing operational constraints of the vehicle;

determining a metric value of a metric representing a difference between the predicted vehicle state and the predicted boundaries of the current vehicle state; and effectuating display of the metric upon the visual display unit, wherein the display depicts the vehicle changing lanes on the roadway based on the predicted boundaries.

11. The method of claim 10, further comprising generating output signals conveying the contextual parameters, the contextual parameters characterizing a contextual environment surrounding the vehicle.

12. The method of claim 11, further comprising:
determining, based on the contextual parameters and the operational information, predicted threshold values of a trajectory metric;

determining in an ongoing manner, based on the contextual parameters and the operational information, a value of the trajectory metric representing a target position along a trajectory of the vehicle; and effectuating display of the trajectory metric upon the visual display unit.

13. The method of claim 12, wherein the predicted threshold values of the trajectory metric account for obstacles in the roadway, lane boundaries, boundaries of the roadway, and/or vehicle width.

14. The method of claim 12, further comprising:
controlling, based on the metric and the trajectory metric, the vehicle such that the predicted boundaries of the predicted vehicle state are maximized, the metric value of the metric is maximized, and/or the value of the trajectory metric does not breach the predicted threshold values of the trajectory metric.

15. The method of claim 14, further comprising such that controlling, based on the metric and the trajectory metric, the vehicle includes controlling the vehicle wholly or partly.

16. The method of claim 11, wherein the contextual environment includes direction of travel of the vehicle, number of lanes on the roadway, lane position of the vehicle on the roadway, position and motion of other vehicles, or the obstacles in the roadway.

17. The method of claim 12, wherein the display of the metric and/or trajectory metric includes colors and/or sounds.

18. The method of claim 10, wherein the operational parameters include acceleration, brake engagement, yaw rate, sideslip, degree of steer, heading, and/or trajectory.

19. The vehicle of claim 1, wherein the lateral force is the front lateral force that influences control of the vehicle.

20. The vehicle of claim 1, wherein the lateral force is indirectly actuated through a value of a steering angle operational parameter.

* * * * *